Feb. 20, 1940.                F. MESINGER                2,190,992
                          PROTECTOR FOR SADDLES
                           Filed Nov. 27, 1936

INVENTOR.
Frederick Mesinger.
BY   William F. Mesinger
                ATTORNEY.

Patented Feb. 20, 1940

2,190,992

UNITED STATES PATENT OFFICE 2,190,992

PROTECTOR FOR SADDLES

Frederick Mesinger, Mount Vernon, N. Y.

Application November 27, 1936, Serial No. 113,055

2 Claims. (Cl. 155—5.23)

This invention relates to protectors for bicycle saddles and has for its principal object to provide means for preventing injury to the sheet material covering on the laterally projecting portions of bicycle saddles.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which.

When a bicycle falls on its side or when it is leaned against a wall, the laterally projecting side of the saddle usually comes into contact with the ground or the wall as the case may be. Such contacts cause injury to the sheet material covering of the saddle seat. The top covering of a saddle is usually a relatively thin flexible grade of leather or a fabric and is subject to serious injury from such abrasive contacts. The life of the saddle is thus materially shortened. When the saddle is of the type having a sheet metal base, the rigidity of the edge of the base over which the cover is stretched causes the cover to be cut through relatively rapidly. The abrasive wear is also particularly undesirable on saddle seats having stitched on coverings for such wear readily cuts the stitches and allows the cover to separate.

According to the present invention the effects of such abrasive contacts are rendered harmless by providing means to resist abrasion for covering the laterally projecting parts of the saddle which are exposed to the abrasive contacts. The mode of attachment of such protectors is varied according to the variety of saddle to be protected. The protectors or contact plates are preferably constructed of sheet metal although other abrasion resistant material may be used. When made of sheet steel the contact plates are preferably rust proofed but the plates may also be made of non rusting metal such as stainless steel.

Figure 1:
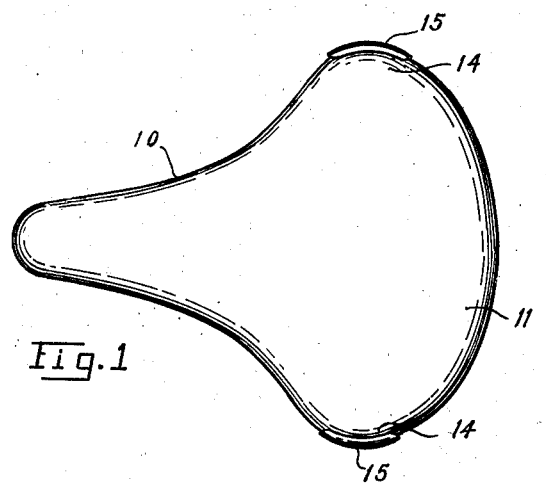
Fig. 1 is a plan view of a saddle seat having protector plates secured thereto according to the invention.
Figure 2:
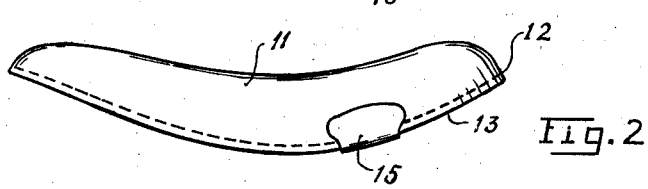
Fig. 2 is an elevational view of the saddle seat with protector plates.

Referring now to the drawing, and particularly to Figs. 1 and 2, the saddle seat 10 is of the variety comprising a shaped base having a layer of hair felt padding on its upper face and a leather covering 11 which is secured to the seat by stitching 12 along the downwardly projecting marginal edges 13. A spring frame is commonly provided for supporting the seat upon the bicycle. Such frame may be of any conventional form and is not shown in the interests of clearness of the drawing. The portions of the seat 10 subject to abrasive injury are the laterally extending parts 14 which are protected from such injury by the protector plates 15.

Figure 4:
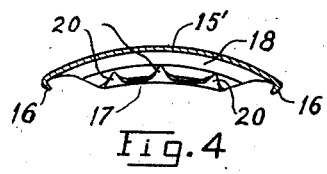
Fig. 4 is a view of a horizontal section taken on the line 4—4 in Fig. 3.
Figure 3:
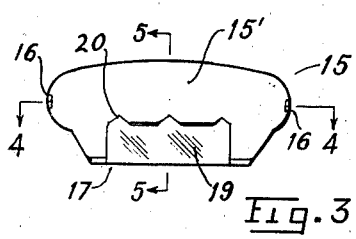
Fig. 3 is an enlarged elevational view of one of the protector plates shown in Figs. 1 and 2.
Figures 5, 6:
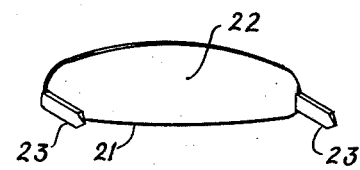
Fig. 5 is a view of a vertical section taken on the line 5—5 in Fig. 3.
Fig. 6 is an enlarged perspective view of another form of protector plate.

One of the plates 15 is more clearly shown in Figs. 3, 4 and 5. It is formed from a single piece of sheet metal and has a dished portion 15' suitably shaped to cover the side projections of the seat. Two triangular points 16 are struck up at each end of plate 15 so as to project inward and grip the leather cover. In this form of the invention, the means for securing the plate to the seat is provided by the portion 17, integral with the lower part of plate 15, and which has an inwardly extending portion 18 from which an ear 19 extends upwardly. The ear 19 has outwardly projecting points 20 which cut into the leather when the ear 19 is pressed toward the plate 15. To assemble the protector 15 to the parts 14 of the saddle, it is merely necessary to place the plate 15 in the desired position while the ear 19 is open so that the downward extending edge 13 of the seat is between the ear 19 and the plate 15' and then squeeze the ear toward the plate until the points 20 cut into the underside of the cover.

Figure 7:
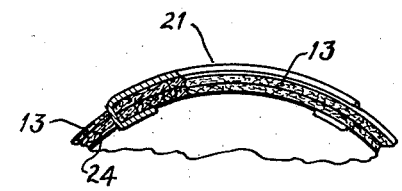
Fig. 7 is a fragmentary, partly sectional view of a portion of a saddle seat viewed from below having the protector plate shown in Fig. 6 secured thereto.

The form of protector plate shown at 21 in Figs. 6 and 7 has a dished portion 22 and is provided with two integral prongs 23 struck up at each end and projecting inwardly. The mode of securing the plate 21 to the seat shown is by passing the prongs 23 through slots cut through the downwardly projecting edge 13 of the seat covering. Fig. 7 being a fragmentary bottom view, the edge 24 of the under cover which is secured to the edge 13 of the top cover is shown. The prongs 23 are bent over against the under cover edge 24.

Figure 8:
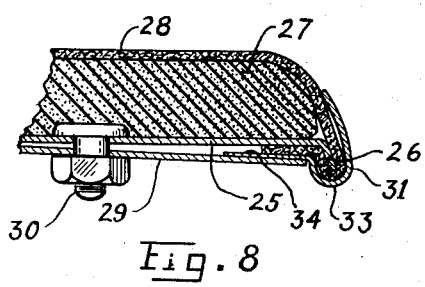
Fig. 8 is a fragmentary, vertical sectional view of another form of saddle seat having still another form of protector plate secured thereto.
Figure 9:
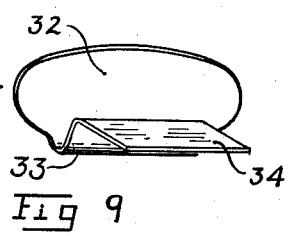
Fig. 9 is a perspective view of the protector plate shown in Fig. 8 constructed according to the invention.

The forms of plates previously described may be adapted to be attached to substantially all saddles having a leather or fabric covering with downwardly projecting edges. Another variety of saddle seat structure is shown in Fig. 8 and comprises a metal base 25 having a downwardly projecting flange 26, a sponge rubber cushion 27 on top of the base, a top cover 28 which is drawn downward and completely around the flange 26 and a metal bottom plate 29 which clamps the edge of the top cover 28 between it and the base 25 when the fastenings such as bolts 30 are applied. The protector plate 31 has a dished portion 32 preferably oval shaped, a curved portion 33 extending around the lower edge of the seat and an integral ear 34 extending inwardly from the curved portion. The plate 31 is secured to the seat by clamping the ear 34 under the bottom plate 29. The curved portion 33 prevents the plate from being displaced outward.

It will be seen that the present protector effectively prevents the injuries to the saddle covering that result from abrasive contacts and that the protector plate may be attached in various ways. The protector plate may be shaped in various forms to have a pleasing appearance as well as for efficient protection.

Since certain changes may be made in the present saddle construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In a bicycle saddle the combination comprising a seat having laterally projecting portions which touch the ground when the bicycle falls on its side, said seat including a metal base, a flexible sheet outer covering and means for securing the edges of said covering to the edges of said base, and metal plates covering the laterally projecting portions, each having an integral ear struck inward from its lower edge, said ear being clamped between said securing means and the edge of said covering so as to secure said plates firmly over said projecting portions.

2. In a bicycle saddle the combination comprising a relatively stiff sheet metal base having a downwardly projecting peripheral rim, a cushion on the upper face of said base, a relatively soft flexible sheet covering over said cushion having peripheral portions extending over and around said rim, a plate under and secured to said base arranged to clamp the peripheral portions of said covering to the base so that said portions are stretched over said rim so as to be subject to injury by abrasive contacts on laterally exposed areas, and metal protectors covering said areas, said protectors having each an ear portion clamped under said plate and a portion connecting the ear to the protector extending around the covered rim whereby said protectors are secured tightly in contact with said areas to be protected.

FREDERICK MESINGER.